(12) United States Patent
Burns

(10) Patent No.: US 8,326,934 B2
(45) Date of Patent: *Dec. 4, 2012

(54) SYSTEM AND METHOD FOR REMOTELY CONFIGURING A DESKTOP MAILBOX

(75) Inventor: Anthony George Burns, Waterloo (CA)

(73) Assignee: Research In Motion Limited, Waterloo (CA)

( * ) Notice: Subject to any disclaimer, the term of this patent is extended or adjusted under 35 U.S.C. 154(b) by 32 days.

This patent is subject to a terminal disclaimer.

(21) Appl. No.: 12/876,496

(22) Filed: Sep. 7, 2010

(65) Prior Publication Data

US 2010/0333181 A1 Dec. 30, 2010

Related U.S. Application Data

(63) Continuation of application No. 10/789,404, filed on Feb. 27, 2004, now Pat. No. 7,797,386.

(51) Int. Cl.
| | |
|---|---|
| G06F 15/16 | (2006.01) |
| G06F 15/173 | (2006.01) |
| G06F 1/24 | (2006.01) |
| G06F 9/00 | (2006.01) |
| H04L 12/28 | (2006.01) |
| H04L 12/56 | (2006.01) |
| H04M 3/00 | (2006.01) |

(52) U.S. Cl. ........ 709/206; 709/203; 709/217; 709/220; 709/223; 709/224; 709/227; 709/228; 370/401; 370/405; 455/418; 713/100

(58) Field of Classification Search .................. None
See application file for complete search history.

(56) References Cited

U.S. PATENT DOCUMENTS

| | | | | |
|---|---|---|---|---|
| 5,251,291 | A * | 10/1993 | Malcolm ........................ | 715/234 |
| 6,006,274 | A * | 12/1999 | Hawkins et al. ............... | 709/248 |
| 6,052,735 | A * | 4/2000 | Ulrich et al. ................... | 709/236 |
| 6,219,694 | B1 * | 4/2001 | Lazaridis et al. .............. | 709/206 |
| 6,401,112 | B1 * | 6/2002 | Boyer et al. ................... | 709/206 |
| 6,894,992 | B1 | 5/2005 | Morvan et al. | |
| 6,983,308 | B1 | 1/2006 | Oberhaus et al. | |
| 7,043,263 | B2 | 5/2006 | Kaplan et al. | |
| 7,127,491 | B2 | 10/2006 | Zirnstein, Jr. | |
| 7,206,815 | B1 * | 4/2007 | Boyer et al. ................... | 709/206 |

(Continued)

FOREIGN PATENT DOCUMENTS

EP 1063821 A2 12/2000

(Continued)

*Primary Examiner* — Ario Etienne
*Assistant Examiner* — Ho Shiu

(57) ABSTRACT

A method and system for remotely configuring a desktop mailbox manager. A mobile node operable to communicate within a wireless network includes a remote desktop controller to generate configuration messages for transmission to a home node at which the desktop mailbox manager is located. When reconfiguration is required, reconfiguration criteria are formulated, usually at the direction of the user. The reconfiguration criteria are then used by the remote desktop controller to create a reconfiguration message, which is addressed for delivery to the home node. A network connection is established, and the reconfiguration message is transmitted. A network server associated with the base station through which the mobile node is communicating with the network routes the message to a server associated with the home node, utilizing an appropriate gateway if necessary. The message is stored on the server until the home node establishes communication and then the message is downloaded to the home node. In the home node, the message is used to reconfigure the desktop manager.

20 Claims, 7 Drawing Sheets

U.S. PATENT DOCUMENTS

| | | | |
|---|---|---|---|
| 7,243,163 B1 | 7/2007 | Friend et al. | |
| 7,594,017 B1* | 9/2009 | DiValentino | 709/227 |
| 7,669,208 B2* | 2/2010 | Wu et al. | 719/328 |
| 7,970,845 B2 | 6/2011 | Yu | 709/206 |
| 8,069,205 B1* | 11/2011 | Voois et al. | 709/204 |
| 2001/0014603 A1 | 8/2001 | Bucknell et al. | |
| 2001/0036822 A1* | 11/2001 | Mead et al. | 455/414 |
| 2002/0044149 A1 | 4/2002 | McCarthy et al. | |
| 2002/0111972 A1 | 8/2002 | Lynch et al. | |
| 2002/0116467 A1* | 8/2002 | Boyer et al. | 709/206 |
| 2002/0158758 A1* | 10/2002 | Iwasaki et al. | 340/531 |
| 2002/0164987 A1* | 11/2002 | Caronni et al. | 455/445 |
| 2003/0055902 A1 | 3/2003 | Amir et al. | |
| 2003/0074408 A1* | 4/2003 | Clark et al. | 709/206 |
| 2003/0088633 A1 | 5/2003 | Chiu et al. | |
| 2003/0101329 A1* | 5/2003 | Lahti et al. | 712/1 |
| 2003/0110371 A1* | 6/2003 | Yang et al. | 713/100 |
| 2003/0115301 A1* | 6/2003 | Koskimies | 709/221 |
| 2003/0126216 A1* | 7/2003 | Avila et al. | 709/206 |
| 2003/0204640 A1* | 10/2003 | Sahinoja et al. | 709/311 |
| 2004/0006551 A1* | 1/2004 | Sahinoja et al. | 707/1 |
| 2004/0019789 A1* | 1/2004 | Buer | 713/170 |
| 2004/0054719 A1* | 3/2004 | Daigle et al. | 709/203 |
| 2004/0054739 A1* | 3/2004 | Friend et al. | 709/206 |
| 2004/0117507 A1* | 6/2004 | Torma | 709/248 |
| 2004/0136404 A1* | 7/2004 | Mahonen et al. | 370/503 |
| 2004/0142711 A1* | 7/2004 | Mahonen et al. | 455/502 |
| 2004/0158583 A1* | 8/2004 | Kaappa | 707/104.1 |
| 2004/0215669 A1* | 10/2004 | Mettala et al. | 707/201 |
| 2004/0215701 A1* | 10/2004 | Vrajich | 709/201 |
| 2004/0220997 A1* | 11/2004 | De Saint-Johns | 709/201 |
| 2004/0225415 A1* | 11/2004 | Newberry | 701/1 |
| 2004/0225731 A1* | 11/2004 | Piispanen et al. | 709/224 |
| 2005/0033830 A1* | 2/2005 | Gorty | 709/220 |
| 2005/0097175 A1* | 5/2005 | Vandeputte | 709/206 |

FOREIGN PATENT DOCUMENTS

| | | |
|---|---|---|
| WO | 97/33421 A1 | 9/1997 |
| WO | 99/33293 A1 | 7/1999 |
| WO | 03/083667 A1 | 10/2003 |

* cited by examiner

SYSTEM AND METHOD FOR REMOTELY CONFIGURING A DESKTOP MAILBOX

CROSS REFERENCE TO RELATED APPLICATION

This application is a continuation of U.S. patent application Ser. No. 10/789,404, filed Feb. 27, 2004, the content of which is incorporated herein by reference.

The present invention relates generally to the field of mobile-network data communications, and more specifically to a system and method for enabling the user of a handheld mobile device to remotely configure desktop mailbox settings.

BACKGROUND OF THE INVENTION

Information can now be exchanged in a variety of ways that were not possible, or at least practicable, only a short time ago. Moreover, these news forms of communication are becoming available to a majority of the world's population rather than only to a relative handful of scientists and engineers.

One popular form of modern communication is electronic mail. Electronic mail, or email for short, began with the transmission of short text messages back and forth between different users connected to a large mainframe computer. As computers systems evolved, large mainframe computers were replaced by smaller computers connected together to form a network. Each user then had an actual computer rather than a display terminal. Though most of these individual computers were far smaller than the mainframe, the aggregate computing power actually increased with the migration from centralized to distributed computing systems. The network allowed its various component computers to share computing resources and memory, and of course to exchange email. Email applications (programs) were developed that were 'user-friendly' so as to allow their use with very little training. Email rapidly became a popular form of communication.

FIG. 1 is an illustration of a personal computer (PC) 100 such as one that may be used to send and receive email messages. PC 100 includes computer 105 and monitor 110. In this illustration, computer 105 is a housing for all of the internal working components (not shown) of PC 100, and provides a plurality of connection ports (also not shown) for hooking up various peripheral devices. One peripheral device of importance is monitor 110, which includes a display 115 that provides a visual user interface. The monitor 110 also houses the electronic components that are necessary to produce a visual image on display 115 from information provided by computer 105. The information is provided via cable 120, which connects the two components. A user may, for example, view on display 115 email messages that have been received, and those that are being composed for transmission.

Another user interface of PC 100 is keyboard 125, which is actually a collection of switch-activating keys modeled after a typewriter keyboard. The keys 130 of keyboard 125 are used type in, or enter, information, for example the text of an email, into computer 105 Keyboard 125 is connected to computer 105 for this purpose by cable 135. As will be explained, PC 100 may serve as a home node in connection with receiving email in a communication network, desktop manager that may be remotely reconfigured in accordance with an embodiment of the present invention. Initially, however, the general process of sending and receiving an email will be set out to provide an environmental context for the present invention.

As mentioned above, for a time email was limited to the office or company environment. Distributed computing led to wider computer access, but connections to others outside of the computer system were generally limited. This changed with the introduction of widespread Internet access. The Internet is a worldwide network of many computer networks that communicate with each other using a common communications protocol. The Internet was originally developed as a military technology, and as a way for colleges and research institutions to share information and computing resources. Eventually, however, use of the Internet by the general public was permitted. Internet service providers (ISPs) eventually installed servers connected to the Internet through which ordinary consumers could access Internet-available resources. The development of the World Wide Web made many of these resources easy to access, especially using newly-developed Web-Browser applications. Email users were no longer limited to sending messages within their own computer systems. Even better email applications made it easier for consumers with little training to compose and send emails, and email became ubiquitous.

Email (or for that matter other communication-service) users are often referred to as subscribers because they subscribe to a network that provides the Internet access they require. Herein the terms user and subscriber will be used interchangeably. When one subscriber wishes to send email to another, the process is typically very easy so long as the intended recipient's address is known. Using any of a number of widely-available email applications, the user simply chooses the "new mail" option, often by "clicking" on an appropriate graphic user interface (GUI). The user is them presented with a template including fields for entering the intended recipient's address, a brief subject, and the message itself. The address is required, of course, but may be filled in with reference to an address book. The address book is a listing of names and email addresses and possible other information such as telephone and fax numbers. The address book may also include additional information such as the capability of the user's email device or a preferred or mandatory format for received emails (which may or may not be visible to the address book owner). This latter information is useful because while emails may be simple text files, they may also include static or even animated graphics. Of course, such emails need not be sent to a user who lacks a device on which they can be displayed.

Where the address of the recipient is not known, it may be found in a directory accessible to the sender through the same network as is used for sending the email itself. In many cases companies and other organizations may a list of their employees or members available publicly or selectively on Web site. An email address listed on a Web page may itself be a GUI that when selected brings up a new mail template that already includes the addressee's name in the appropriate field.

An email can, and often is sent to more than one intended recipient. The email template can accommodate almost any number of addresses and can usually categorize them according to whether they are addressees or copyees. (As with pen and ink correspondence, a "copy" of a message is virtually identical to the original, but the categorization implies something of the sender's intention in including any particular recipient.) In many cases, the sender can elect whether the individual recipients will be able to see a list of all of the intended recipients, although a designation of someone as a "blind" copyee will normally ensure that their name is not disclosed to the others.

However it is initiated, the completed email message including one or more destination addresses, a body, and usually though not necessarily a subject is sent by activating an appropriate GUI. This will normally result in the email being transmitted immediately, assuming network access is available. The subscriber typically has other options, including saving the email for editing and sending later, or indicating that the email should be transmitted at a specific time or on the occurrence of a specified event. If network access is not available, an access attempt may be initiated automatically, or the user may be informed that the email cannot be sent at that time.

Once an email is sent by a subscriber, it is received in an associated server, which in turn routes it toward servers used by the intended recipients, as indicated by their address. At the recipient's server, it will typically be stored until it is downloaded to the actual user device at which it may be read, or until the occurrence of some other specified event. How quickly it will be downloaded frequently depends on the type of Internet connection available to the recipient.

Those recipients with dial-up connections, where communication with the server takes place over a conventional phone line, the email cannot be downloaded until such a connection is made. Increasingly, subscribers use a form of high-speed connection that may be continually in place. In this configuration, email downloads are often performed automatically on a periodic basis. However it occurs, however, an email is available for reading at the subscriber's device as soon as it is downloaded.

Another new form of communication, using radio telephones, has became popular as well. A radio telephone is simply a portable radio (transmitter-receiver) equipped with a standard telephone keypad, which can be used to place and receive calls through an appropriate radiotelephone network. The network typically includes a network of fixed-location antennas for communicating with the radio telephones. The antennas are spread throughout the network coverage area so that the radiotelephone is (within the area) always only a short distance from one or more antennas. This arrangement allows communication over the air interface to be relatively low-power, which not only reduces the needed battery capacity for the radio, but also enables channel frequencies to be used for multiple network transmissions as long as they are not too close together. The area defined by the communication range of an antenna is called a cell, giving rise to the popular name of "cellular telephone", or simply "cell phone".

Cell phones have become useful for receiving both voice and data communications. Email transmission did not immediately migrate to cellular networks, however, for a number of reasons. For one thing, cell phones became popular with the general public somewhat before email use became prevalent outside closed office environments. More importantly, however, cellular networks could not instantly be adapted to sending email messages to mobile users. Somewhat difficult to transmit through a network more suited for voice communication, there was also the factor that subscribers were basically equipped with mobile telephones, some of which had LED or LCD displays that would display at most a handful of telephone numbers at one time.

Mobile subscribers having cell phones, however, wished to be able to receive email while they were away form the home or office. A solution was provided in the form of a handheld mobile device that could more easily accommodate both voice and email forms of communications through a specialized network. FIG. 2 is an illustration of a handheld mobile device 200 that may be used for both email and voice communication. Handheld mobile device 200 includes a display 205, such as an LCD (liquid-crystal display) that is capable of displaying not only multiple lines of text, but graphic images as well. A keyboard 210 includes alphanumeric keys 215 and call control keys 220 for the entry of text messages and beginning and ending a wireless call, respectively. Scroll key 225 is a thumbwheel for manipulation of the image on display 105. Function keys 230 execute a variety of operations, depending on the state in which handheld device 200 is currently in. Words or icons presented on display 205 adjacent to each of the function keys 230 are used to indicate the keys' current function. The operation executed by activating either of function keys 230 is usually displayed on display 205. Speaker 240 and microphone 235 facilitate voice communication.

Handheld mobile device 200 may be capable of other functions as well. In emulation of similar applications developed for PCs, small electronic devices were provided with organizer programs that could be used for managing and displaying appointment calendars, address books and similar functions. Often called personal digital assistants (PDAs), such devices could make use of display screens and keyboards present on handheld mobile devices such as mobile device 200. Despite having all of these capabilities, however, handheld device 200 did not entirely replace PC 100. To remain mobile, its display and keyboard must be limited in size and therefore not always as convenient to use.

The two devices may be used in combination, however, to great advantage. PC 100, for example, is installed in a fixed location such as the user's home or office to send and receive email, and perhaps to maintain the user's organizer data, such as the appointment calendar and address book. Handheld device 200 is carried when the user is not at the fixed location to have access to the same functions. Email addressed to the user is selectively forwarded to the handheld device 200 so that it can be read immediately. The same organizer data kept on PC 100 is also kept on handheld device 200, and the two devices are connected from time to time to synchronize the data. Because of the way the two devices work together, it is also advantageous to be able to from time to time connect them through a communication network. When this occurs, the PC 100 may be thought of as a network home node, and the handheld device 200 as a network mobile node.

As will be explained in more detail, PC 100 includes application software for not only receiving email, but for managing it as well. Managing email encompasses storing it in an organized fashion and selectively forwarding it to handheld mobile device 200 (or some other address). Before the user leaves the fixed location where PC 100 is installed, the user may set certain parameters for performing these functions. There is currently no way, however, for the user to alter those parameters before returning to do so at the PC 100 itself. There is a need, therefore, for a manner of reconfiguring the manager of the home node from the mobile handheld device. The present invention provides just such a solution.

SUMMARY OF THE INVENTION

The present invention is directed to a manner of using mobile node, such as a handheld device operable in a cellular communication network, to remotely reconfigure the desktop settings of a home node. In one aspect, the present invention is a system including a reconfiguration message generator for generating a reconfiguration message that indicates those changes that a user of the mobile node wishes to make to the home-node desktop configuration, and a home-node reconfiguration message processor coupled to the desktop manager and selectively coupled to the communication network for changing the desktop configuration according to the reconfiguration message when it is received from the mobile node.

In one embodiment, the reconfiguration message generator is resident in the mobile node and the reconfiguration message is transmitted at the user's request. Where the mobile node includes an organizer database that may be synchronized with a home-node organizer database over the communication network, the reconfiguration message may also be transmitted with the organizer synchronization data.

In another aspect the present invention is a method of remotely configuring a communication-network home-node desktop manager including the steps of enabling the desktop manager for remote reconfiguration, providing a mobile node selectively operable in the communication network, generating a reconfiguration message, transmitting the reconfiguration message to the home node through the communication network, receiving and processing the reconfiguration message in the home node, and transmitting a reconfiguration confirmation message to the mobile node confirm that the requested changes have been made. The method may also include the steps of requesting that the home node generate and transmit a configuration status summary, receiving the configuration status summary in the mobile node, and presenting it on a display of the mobile node so that the subscriber using the mobile node is aware of the current configuration of the desktop manager before requesting any changes. The configuration status summary may also be automatically included in the reconfiguration confirmation message so that it may be stored at the mobile node for future reference. The reconfiguration message may be generated in the mobile node itself or may be generated by a server in communication with the Internet after sending an interactive Web page to the mobile device and receiving back a transmission including an indication of changes that the subscriber wishes to implement.

In yet another embodiment, the present invention is a handheld mobile device operable to communicate with one or more home nodes though a communication network, including a reconfiguration message generator for generating a reconfiguration message to request that the home node reconfigure the desktop manager settings according to instructions provided in the reconfiguration message. The mobile handheld device may also include a configuration status summary request generator for determining the current configuration of the home-node desktop manager prior to generating the reconfiguration message. The handheld mobile device may also include a Web browser for interacting with a Web site in order to determine, in an alternate embodiment, the desktop manager configuration status and generate a reconfiguration message.

DETAILED DESCRIPTION

The present invention is directed at a manner of remotely reconfiguring a desktop mailbox manager. This system and method is of particular advantage in an environment where a particular subscriber uses a home node as a primary place to send and receive email messages, and to fill in and consult an appointment calendar that is part of a desktop organizer application. The home node is typically a personal computer (PC), and may actually be located at the user's home, workplace, school, or other location. A mobile node is used by the subscriber when in transit, or when at a location away from the home node. Mobile nodes are convenient for their portability, but for this reason generally possess user interfaces such as displays and keyboards that are far smaller then those of a PC. The mobile device of FIG. 1, for example, may have a keyboard that is less than a tenth the size of PC keyboard 125 (shown in FIG. 1).

Figure 2:
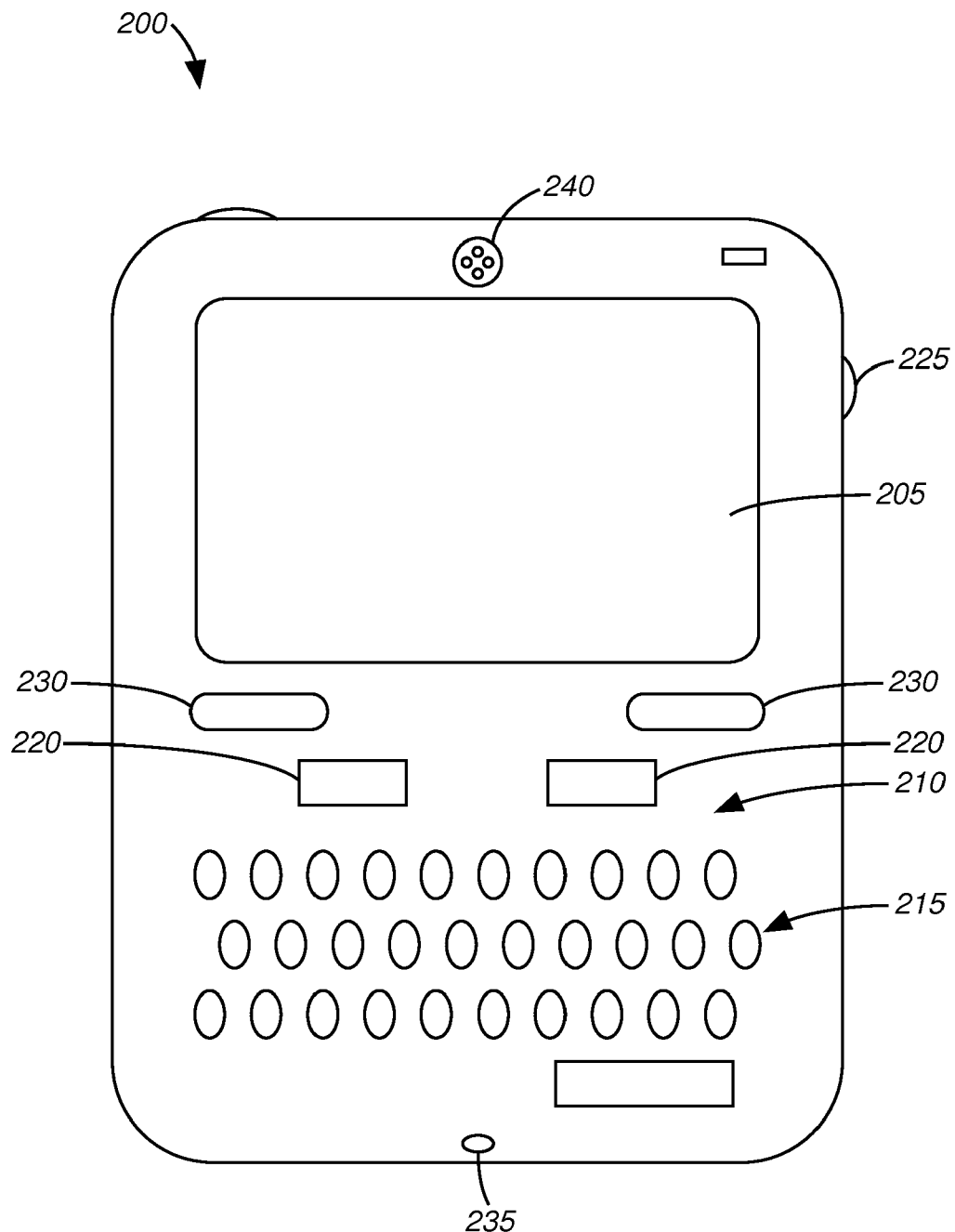
FIG. 2 is an illustration of a handheld device such as one that may serve as a mobile node and be used to remotely reconfigure the desktop manager of a home node such as the PC illustrated in FIG. 1 in accordance with an embodiment of the present invention.

The handheld mobile device 200 of FIG. 2 is preferably also capable of performing certain email and organizer functions, but using applications that are more suited to its smaller size. For example, display 205 of mobile device 200 may present numerous lines of text, but is less than suitable for the presentation of large amounts of information or animated graphic images. It remains, however, very useful to the subscriber who wishes to schedule an activity, or read and respond to a short email message, especially when away from the location of the home-node PC.

Figure 1:
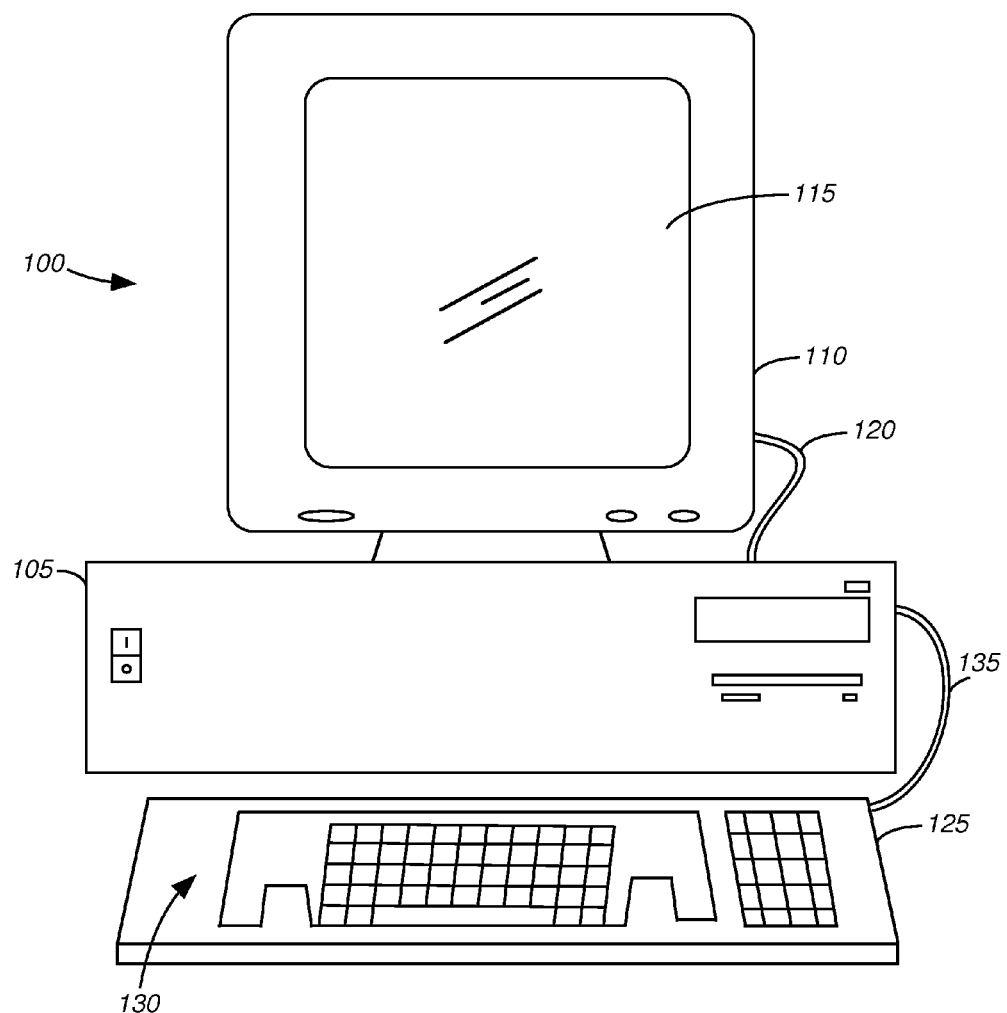
FIG. 1 is an illustration of a personal computer (PC) such as one that may serve as a home node and include a desktop manager that may be remotely reconfigured in accordance with an embodiment of the present invention.
Figure 3A:
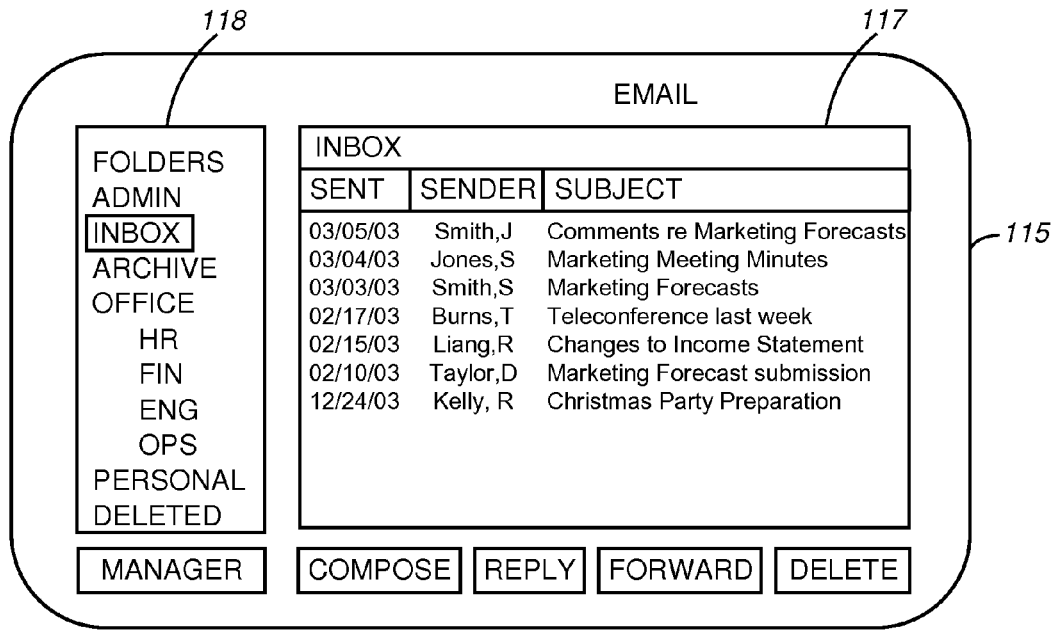
FIG. 3a is an illustration of PC display shown in FIG. 1, presenting an email screen exemplary of one that might appear on that device.
Figure 3B:
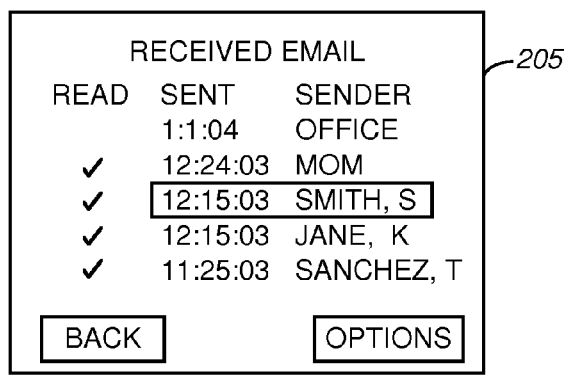
FIG. 3b is an illustration of the handheld-device display shown in FIG. 2, presenting an email screen exemplary of one that might appear on that device.

FIG. 3a is an illustration of display 115 of the PC 100 shown in FIG. 1, presenting an email screen exemplary of one that might appear on that device. FIG. 3b is an illustration of display 205 of the handheld mobile device 200 shown in FIG. 2, presenting an email screen exemplary of one that might appear on that device. From FIGS. 3a and 3b it should be apparent that far more information may be presented on the larger PC display 115 than on the smaller display 205. Although valuable for its mobility, the handheld device 200 is less convenient for dealing with large amounts of email as might be encountered at PC 100.

When at PC 100, an email application on the PC enables the user to compose and send emails messages. Correspondingly, an email application on a recipient's computer enables the user to receive and read email messages. Almost universally, of course, such programs enable both sending and receiving. The sending and receiving applications need not, however, operate identically as long as they use a protocol understandable to each.

When an email is received, an indication is typically provided to the user in some fashion. The user may then decide to review a list of received emails provided on a display screen in what is commonly referred to as an inbox. A typical inbox such as inbox 117 shown in FIG. 3a lists each received message by the time and date received, (purported) identity of the sender, and subject. The inbox display will often indicate which of the listed messaged have been opened for reading. Other information may be displayed as well, such as a priority flag or an indication whether a reply to the message has been sent.

Opening a message usually involves selecting, pointing to, or highlighting it and indicating in some fashion that the user wishes to read it, such as by clicking a mouse button or pressing enter. A separate window is then provided, either over or next to the inbox, where the full email message is displayed. When either the inbox listing or the message being read are too long for convenient display, of course, it may be necessary for the user to scroll or go to successive windows. Note that an email application could automatically open messages as they are received, though with the quantity of email most modern subscribers receive this would undoubtedly prove to be an inconvenience.

Actually, the amount of email received may be so large that it is difficult to keep track of. It could be displayed in an inbox, but after a while the inbox would become very long. And not all emails are of the same importance or interest. So an email that a subscriber wants to save and refer back to later may be difficult to find. Some inboxes will let the user sort the email list, for example by sender. But all related emails may not be from the same person, so this is not always the best solution. One answer that has evolved is for the inbox to be divided into folders. A main folder may include all incoming mail, both read and unread. Sub-folders may be provided with the application or created by the user, who might wish to separate emails related to work from those associated with church or school activities, or those from family members. An exemplary folder list 118 is shown in FIG. 3*a*. The user may then move emails from one folder to another by using a click-and-drag or some similar operation. Moving an email refers not to its physical location, of course, but rather to the list it will be displayed on. Users may select a folder to view the listed emails that have been moved there. In hierarchical fashion, subfolders may be further divided into sub-sub-folders, and so on.

In some cases, emails may be automatically moved from one folder to another without having to be individually designated by the user. For one example, emails that have been opened for reading may be sent to a "read mail" folder, or be sent after they have remained in the inbox for a selected number of days. For another, emails may be sorted upon downloading, with high priority or urgent emails placed in one folder and lower-priority emails placed in another. Emails may also be automatically placed in a specific folder based on the sender or the subject. The criteria for automatically sorting emails into different folders may be based on criteria set within the application as a default, or on those specified by the user.

The automatic placing of emails in different folders may be certain criteria is a function of what will herein be referred to as the desktop email manager. The email manager may be viewed as a single program module, or may be divided between a number of different modules that cooperate to perform the email manager functions. For convenience herein, the email manager will be viewed in each node as a single entity. The functions of the email manager will now be described. Note, however, that this description is exemplary and precise functions may vary from application to application.

As mentioned above, a subscriber may receive a tremendous quantity of email. In addition, emails now tend to contain a good deal more content, and may represent important communications. Some emails are business related, and may constitute the only record of a transaction. Others are for entertainment, but keeping them is nevertheless a desire of the recipient. On the other hand, some email messages are unwanted for one reason or another. Perhaps they contain nothing but unsolicited offers to sell products in which the recipient has no interest. Some may even include harmful computer programs called viruses, sent with malicious intent. Others are simply routine and of little value. The email manager helps sort and disposition emails to allow the user to more easily keep (and later find) those that are more desirable and discard those that are not.

When an email is received, it is examined by the email manager to see of it matches any of the selected criteria. These criteria may be preset but are more valuable when adjusted to the needs and tastes of the subscriber. Upon examination, the email manager will then disposition the email according to instructions associated with the criteria. The email may be sorted, as described above. It may also be deleted if it purports to be from a specified user that the subscriber does not wish to receive email from. Alternately, only email from acceptable users is delivered to the email inbox. If delivery is for some reason not to occur, the email manager may generate a message of reply to the sender, informing them of the delivery failure. A message may also in some cases be drafted for presentation to the user.

When an email manager is to decide whether an email is to be delivered at all, this function may be called filtering. Filters typically allow or deny delivery based upon the identity of the sender, the originating email server, the subject, or some other characteristic of the email. The filters do not detect viruses themselves, but may attempt to thwart their acceptance by discarding mail from unknown sources. Note that the actions of the desktop email manager may be performed upon receipt of the email or in some instances at some future time; for example when read email is transferred to an archive folder after expiration of a selected period of time.

In the context of the present invention, the desktop email manager may also be used to determine which emails addressed to the user should also be forwarded for delivery to the mobile node as well. Emails, of course can be forwarded to other addresses as well, or to more then one address. As mentioned above, the size limitations of mobile handheld device 200 may render it less than convenient for handling a large volume of email as might be encountered at the home node device, for example PC 100. The desktop email manager may, for example, be configured to send to the mobile node only work-related emails, or those related to a single project, or those from a certain sender or senders. Of course, presently these parameters must be established when the user is at the home-node location and has access to the desktop manager of PC 100 (or other home node device). But factors influencing the choice of forwarding parameters (and other email manager settings) may change before a traveling subscriber returns to the home node. For this reason, the present invention provides for a remote reconfiguration.

Figure 4:
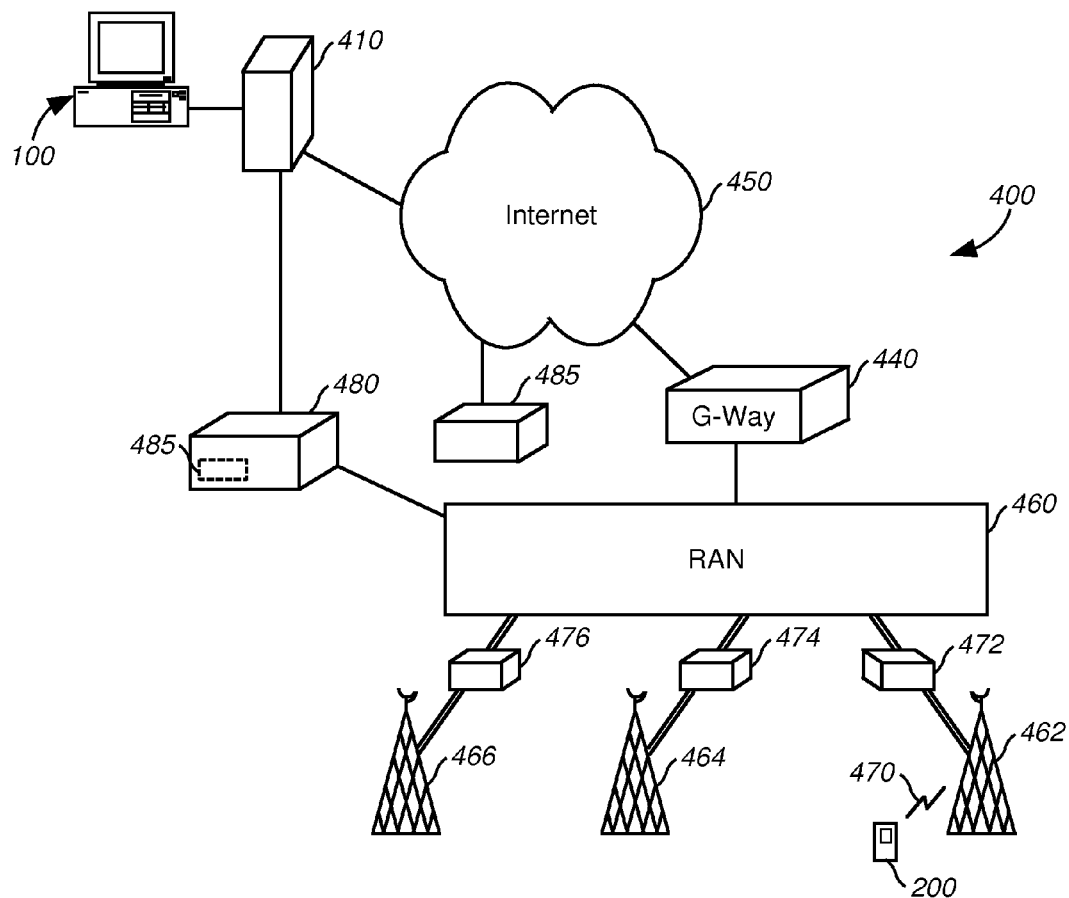
FIG. 4 is a simplified block diagram illustrating selected components of a communication network adapted for use according to an embodiment of the present invention.

Before outlining the procedure for remote reconfiguration, the overall network used for communicating between the home node and the mobile node will be reviewed. FIG. 4 is a simplified block diagram illustrating selected components of communication network 400 adapted for use according to an embodiment of the present invention. Note that FIG. 4 is an exemplary network, and other configurations are employable so long as they are compatible with the system and method described herein. In FIG. 4, PC 100 forms the home node and mobile handheld device 200 forms the mobile node. Note that the terms home node and mobile node, however, describe the respective functions of these devices in the context of the present invention and do not require the use of any specific device. In some networks, the two illustrated devices could even switch functions, although there would be no apparent advantage in doing do.

In the embodiment of FIG. 4, PC 100 communicates with Internet 450 through a server 410. This connection is, of course, used for email and for any other Internet related communications, such as Web-surfing. Being mobile, handheld device 200 uses a wireless channel to communicate with a wireless network antenna. As mentioned previously, there are typically many such antennas spread over a wide region so that one is always within communication range of handheld device 200. In FIG. 4, device 200 is communicating with radio access network (RAN) 460 through air interface channel 470 using nearby antenna 462 and base station controller 472. If mobile handheld device 200 relocates, communications with it may be handed over to one of antennas 464 or 466, which operate in conjunction with base station controllers 474 or 476, respectively. Although only three antennas are shown in FIG. 4, there may be, and typically are many more.

Through RAN 460, mobile handheld device 200 is able to communicate with and through the Internet 450. Gateway 440 provides the interconnection between the two networks and is responsible for effecting any necessary changes in format or repackaging of transmitted data. Handheld device 200 may use this internet connection to send reconfiguration communications to home node PC 100. As will be explained in more detail below, reconfiguration messages may be generated solely in the handheld device 200 itself, or in connection with server 485, which includes a Web site constructed for facilitating this operation.

Figure 5:
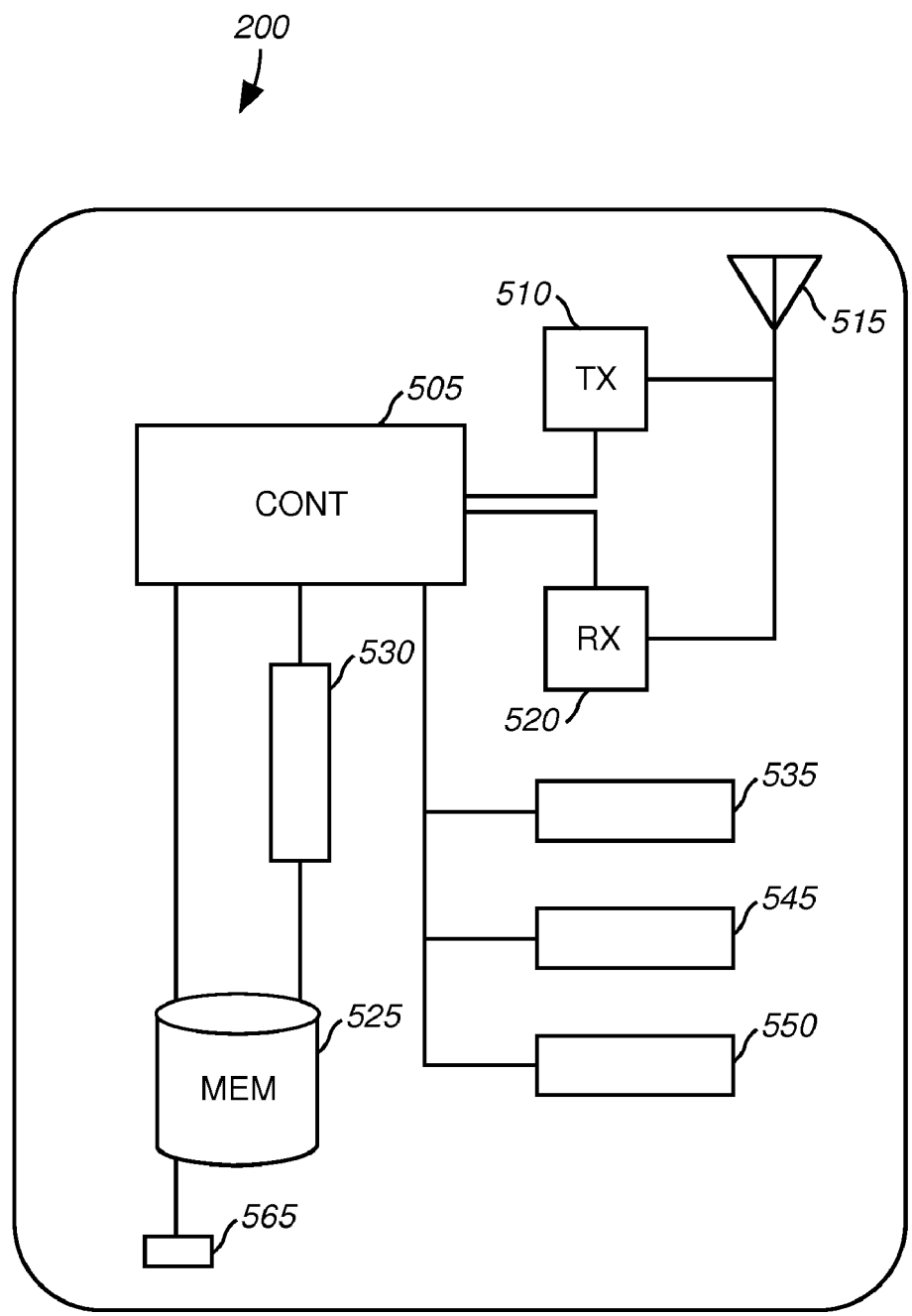
FIG. 5 is a simplified block diagram illustrating selected internal components of the handheld device of FIG. 2 in accordance with an embodiment of the present invention.

In one embodiment, mobile communication device 200 includes an organizer function for managing data stored in an internal memory device. FIG. 5 is a simplified block diagram illustrating selected internal components of handheld device 200 in accordance with an embodiment of the present invention. Device 200 is a wireless mobile device, and is provided with transmitter circuitry 510 and receiver circuitry 520 operable to transmit and receive, respectively, using antenna 515. The various internal components of device 200 operate under the direction of controller 505. Note that although one controller is shown in FIG. 5, there may be separate controllers for performing the operations associated with the present invention. Organizer 530, mentioned above, organizes certain application-related information stored in memory device 525. The stored organizer information may be entered by the subscriber at the mobile handheld device 200, or may be received there through receive circuitry 520. (Other means of input, such as a temporary cable connection (not shown) to PC 100, may also be used.)

Organizer 530, in association with memory device 525, forms an organizer database. There is preferably also a corresponding organizer data base (not shown) on PC 100, that also keeps track of organizer-related information for the user. The two databases may be synchronized in order that information added, deleted, or changed at one node may be updated at the other. More than one mobile node and home node may be used for this purpose, of course, but for simplicity only two are illustrated in FIG. 4. A sync message generator 545 is operable to for sync messages for the purposes of synchronizing the two databases. (Again, a corresponding message generator in PC 100 is not shown.)

When a sync message is generated, it may be communicated through air interface 470 and RAN 460 to enterprise server 480, which includes sync server 485 (shown in FIG. 4). In the illustrated embodiment, sync server 485 includes a number of functions related to the synchronization operation, which it performs with PC 100 through server 410. (Again, the communication paths and the server functions and locations may vary from implementation to implementation.)

Instead of communicating with server 410 through Internet 450, the handheld device may send reconfiguration messages generated by reconfiguration message generator 550 (shown in FIG. 5) along with the sync messages being transmitted through enterprise server 480. This has the advantage of coordinating the two functions, which may be performed automatically on a periodic basis, or at the subscriber's direction. Of course, either function can be performed in this manner without the other if needed.

Returning to FIG. 5, also included in handheld device 200 is a configuration status request generator 535 for generating configuration status request messages, as will be explained in more detail below. Finally, a unique identifier 565 is also installed in device 200, and can be included in any of the transmitted messages to authenticate their origin.

Figure 6:
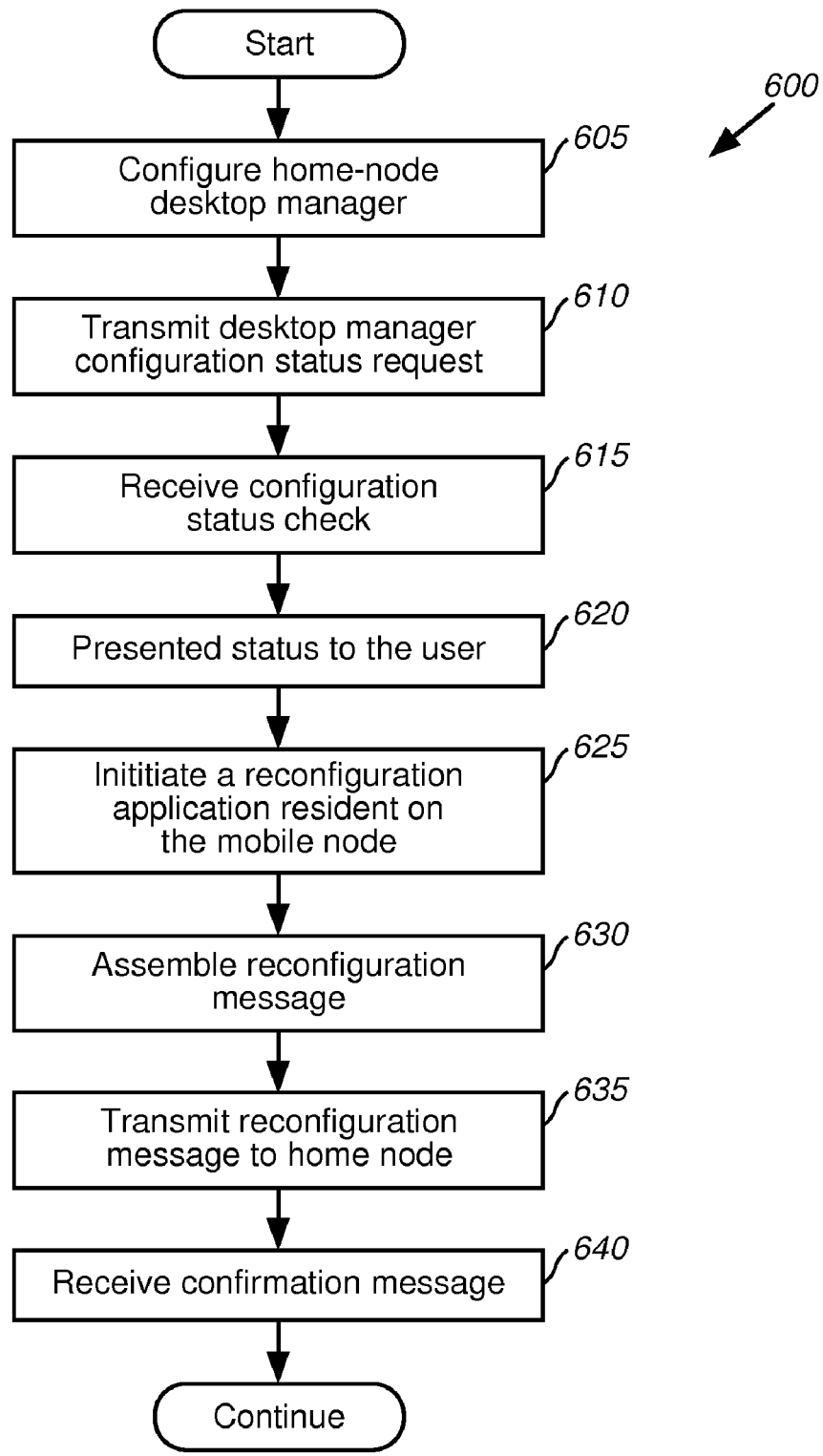
FIG. 6 is a flow diagram illustrating a method of remotely configuring a home node desktop manager according to an embodiment of the present invention.

FIG. 6 is a flow diagram illustrating a method of remotely configuring a home node desktop manager according to an embodiment of the present invention. This method is viewed from the perspective of the subscriber. At START, it is assumed that the subscriber is equipped with a home-node such as the PC of FIG. 1 and a mobile node such as a handheld communication device of FIG. 2. Of course, these are not the only such devices that may be used in accordance with the method of the present invention. It is further presumed that the two devices may communicate with each other through a communication network when the mobile device is at a remote location, although they may be able to communicate with each other at close range as well, for example via a USB cable.

The user in most situations will configure a desktop manager resident on the home node (step 605) while working at the device itself because it may be the easiest way to do so. As mentioned above, the user may also accept whatever defaults have been provided if they are suitable. Many times, however, the user will want to set the configuration just prior to leaving the home-node location, because at that time the setting can be based on the immediate circumstances. In some cases, remote access or reconfiguration will not be required, at least not until the user returns. The need for remote reconfiguration often does arise, however, for a variety of reasons. The user may have just not remembered to properly configure the desktop manager prior to departure. Or circumstances may have changed, for example, with a particular project that has become either a higher or a lower priority. The subscriber may have simply changed their mind.

For what ever reason reconfiguration is required, the user in most cases continues by using the mobile node to request a desktop manager configuration status check (step 610). The request is sent via the communication network and is received by the home node. The home node responds by returning a configuration status summary, which is received in the mobile node (step 615) and presented to the user (step 620). The status check confirms for the user the current state of the desktop manager settings. In one embodiment, the status check (step 610) is optional, for many times the user will be well aware of, or not care about the current configuration. In another embodiment, status check (step 610) is required so that the user does not inadvertently change the configuration to an undesirable state. In yet another embodiment, the status check (step 610) is required only when certain types of changes are being made to the existing configuration.

Assuming that the subscriber at this point wishes to continue with the reconfiguration, the subscriber initiates a reconfiguration application resident on the mobile node (step 625). The purpose of this application is to permit the user to generate a message for transmission back to the home node. The user then indicates the changes that will be made to the existing configuration file (step 630). For purposes of efficiency, it is preferred that the reconfiguration message being generated include only changes to the desktop manager, rather than a complete reconfiguration including instructions to change those settings that are already in accord with the subscriber's preference (step not shown). At this point, the user may review the changes that have been indicated, and is preferably able to make any necessary changes to the reconfiguration message prior to sending it. When the reconfiguration message is assembled to the subscriber's satisfaction, it is transmitted to the home node (step 635) via the communication network.

In a preferred embodiment, when the home node actually reconfigures the home-node desktop manager in response to the reconfiguration message it sends a confirmation message that, when received in the mobile node (step 640) notifies the user that the reconfiguration has been completed.

Figure 7:
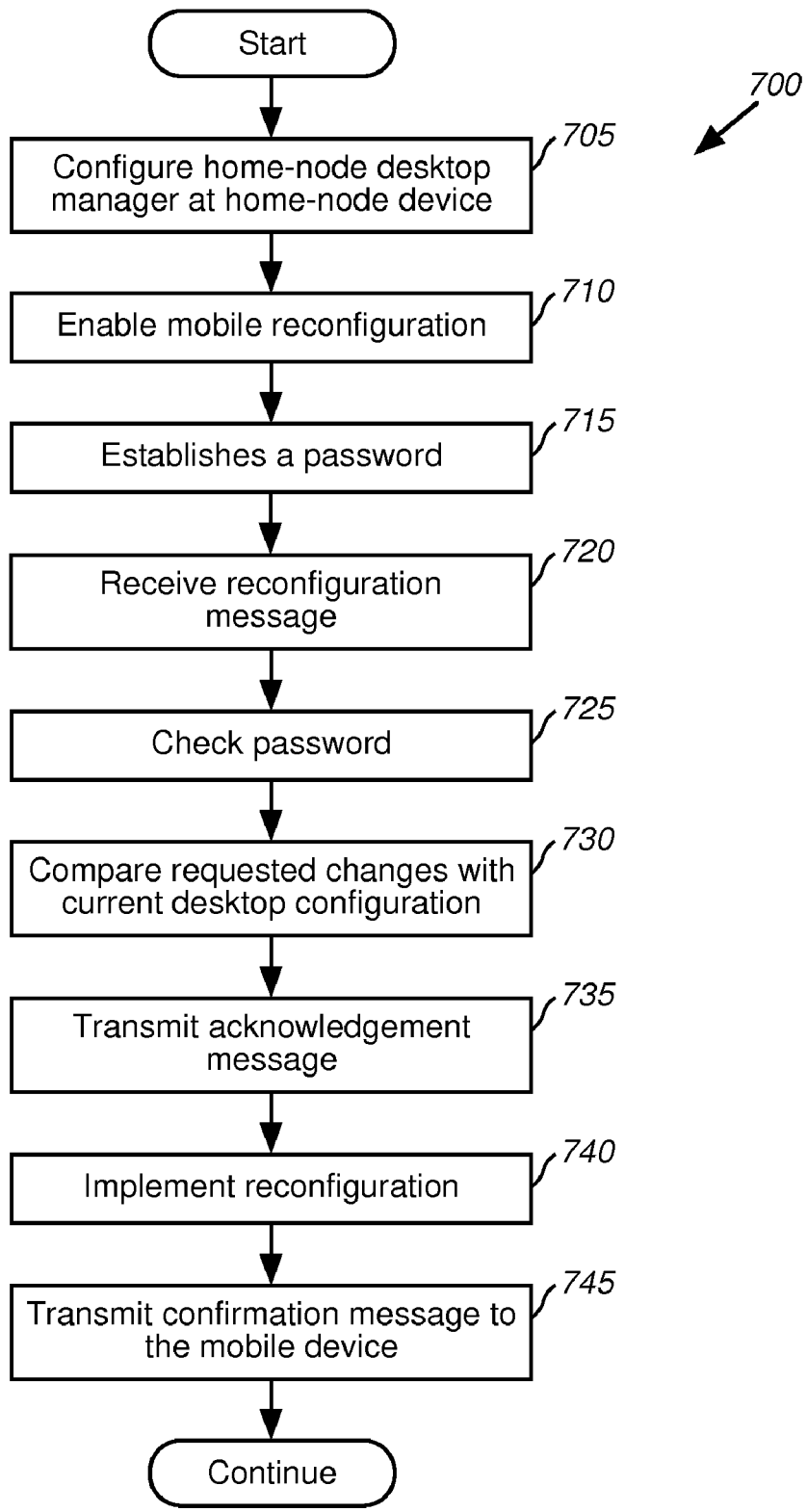
FIG. 7 is a flow diagram illustrating a method of remotely configuring a home node desktop manager according to an embodiment of the present invention.

FIG. 7 is a flow diagram illustrating a method 700 of remotely configuring a home node desktop manager according to an embodiment of the present invention. The method of FIG. 7 is viewed from the perspective of the home node, but note that it is not necessarily fully correlated with the methods of other embodiments presented herein. At START, however, it is again presumed that the subscriber is equipped with a home-node such as the PC of FIG. 1 and a mobile node such as a handheld communication device of FIG. 2. At step 705, the home-node desktop manager is configured using the home-node device itself. Next, mobile reconfiguration is enabled (step 710). This security feature attempts to ensure that reconfigurations not approved by the subscriber are not intentionally or inadvertently performed. It is of course not required, and the desktop may be designed with default of secured or unsecured with respect to mobile reconfiguration. In the embodiment of FIG. 7, a secure desktop is presumed, and so the user establishes a password (step 715) that will be required for remote reconfiguration to occur. In one embodiment, no further reconfiguration of the desktop manager at all (using whatever node) will be permitted without submission of the established password. Other security devices may be used as well, such as specifying that only reconfiguration messages received from a certain identifiable device or devices will be executed (step not shown). And of course the security device may be designed to permit some changes and restrict others.

The process is then dormant until a reconfiguration message is received (step 720), when the password (or other security device) transmitted with the message is checked (step 725). If the security check indicates that the message is proper, the reconfiguration requested in the message is compared with the current configuration to make sure the requested changes can or should in fact be executed (step 730). Note that this step may be useful for several reasons. The user may have inadvertently requested changes that are logically inconsistent with current but unchanged settings, so that implementing the requested reconfiguration would lead to unpredictable results. This may occur, for example, where certain changes are not enabled by request from a mobile device, and the reconfiguration message contains both enabled and un-enabled changes. In another scenario, the reconfiguration request may not 'match up' with the current configuration in some way. The requested changes may attempt to change the settings to those already in place, which may or may not have been the intent of the mobile user.

After comparing the reconfiguration message to the current configuration (step 730) the home device may send an acknowledgement message to the mobile device (step 735), indicating the comparison results. This is naturally more important in the event that the changes cannot be made, or at least some reason to request reconfirmation (step not shown) has occurred, but it may be sent to indicate that the comparison of step 730 found no problems. The requested reconfiguration is then implemented (step 740), and then point a confirmation message is transmitted to the mobile device (step 745). The confirmation message of step 745 may include a summary of the then-current configuration that can be stored at the mobile node for reference later.

Two embodiments of the message communication portion of the present invention will now be described. In a first embodiment, the mobile unit includes a personal digital assistant (PDA) and may be used for organizer function such as maintaining a calendar, address book, to-do list and so forth that may be kept in sync with a corresponding information management module of the home-node. For example the time of an event, a new appointment, or the phone number of a contact may be updated by the user at only one of the nodes. Later, the mobile node may run what is sometimes referred to as a PIM sync, a process whereby the home node and the mobile node can compare information, note any differences, and conduct an update so that both databases have the most current information. (The rules for updates can themselves be adjusted in such a way that "most recent entry" is not the only criterion for deciding which of the databases to update.) The PIM sync may be run at the user's request or automatically on a periodic basis, assuming of course that the mobile node is within range of an appropriate base station antenna.

In this environment, the subscriber operating a mobile node may simply indicate any changes that need to be made to the home-node desktop manager, assembling in the process a reconfiguration message that may be transmitted to the home node along with the other PIM sync information. Of course, the reconfiguration message may be the only new information that needs to be transmitted. The reconfiguration message may be mandatory, or may be updated in a similar fashion as the rest of the PIM sync information. In other words, the mobile node may retain the reconfiguration selections as data, which is then compared to that stored in the home node, and the most current (or otherwise favored) information updated into both nodes.

In another environment, reconfiguration messages can be sent via the Internet. Here the subscriber establishes a connection through which World Wide Web sites can be accessed, and requests download of a Web page from a site that has been constructed for this purpose (though perhaps not solely for this purpose). The downloaded Web page, which may be adjusted so as to fit the mobile device's display, becomes an interactive way for the subscriber to update desktop manager preferences. The updated Web page will provide a link for sending the reconfiguration message once it is complete. The Web page in some instances The Web page in some instances can be kept up to date with the home node's current preferences so that the subscriber may view them when the Web is accessed.

The methods above represent exemplary embodiments and others may be formulated in accordance with the present invention. It is also noted that the sequence of steps in any of these methods is not mandatory unless explicitly stated or logically required to be so.

The previous descriptions are of preferred examples for implementing the present invention, though the scope of the invention should not necessarily be limited by this description. Rather, the scope of the invention is defined by the following claims.

What is claimed is:

1. A method for configuring a home-node email manager program and reconfiguring the home-node email manager program from a mobile-node through a communication network, the home-node email manager program being capable of automatically effectuating a plurality of different dispositions for different email messages received at the home node, in accordance with a configuration of the home-node email manager program and wherein the mobile node includes a memory device operable to store a mobile node security feature identification and a current configuration status, said method comprising:

receiving a mobile-node-generated status summary request that requests a current configuration of the home-node email manager program;

returning a configuration status summary of a first configuration to the mobile-node-generated status summary request, said first configuration being the current configuration of the home node email manager program when the status summary request is received;

receiving, at the home-node email manager program, which is configured with said first configuration and at which a home node security identification is established, a reconfiguration message from the mobile-node, said reconfiguration message including the mobile node security feature identification and a reconfiguration change to a home node reconfiguration file for reconfiguring effectuation of an email-disposition change;

checking said home node security feature identification against said mobile node security feature identification;

when said home node security feature identification and said mobile node security feature identification match, comparing the included reconfiguration change with said first configuration to determine if the reconfiguration change is considered to be proper and logically consistent with said first configuration; and when said reconfiguration change is determined to be proper and logically consistent with said first configuration, reconfiguring the home-node email manager program to a second configuration including the email-disposition change of said reconfiguration change, wherein a first type email message received at the home node is automatically provided a first type of disposition prior to receipt of the reconfiguration message and provided a second type of disposition after receipt of the reconfiguration message, the email messages unchanged by dispositions.

2. The method of claim 1 further comprising transmitting an acknowledgement message to the mobile-node indicating results of said comparison of the included reconfiguration change with said first configuration.

3. The method of claim 2 wherein said acknowledgement message includes a request for mobile-node reconfirmation message when said reconfiguration change is determined to be incompatible with said first configuration.

4. The method of claim 1 wherein said configuring the home-node email manager program is accomplished directly at the home-node device.

5. The method of claim 1 wherein said mobile node and home node security feature identification comprises a password.

6. The method of claim 1 wherein said mobile node and home node security feature identification further comprises a specifying of only certain mobile-nodes as authorized to have reconfiguration messages executed by the home-node.

7. The method of claim 1 further comprising transmitting a confirmation message to said mobile-node, said confirmation message including a summary of said home-node desktop manager program second configuration.

8. Apparatus for a home-node of a communication network having a mobile-node comprising a memory device operable to store a mobile node security feature identification and a current configuration status message, the home-node including an home node email manager program capable of automatically effectuating a plurality of different dispositions for different email messages received at the home-node, in accordance with a first configuration of the home-node email manager program, said apparatus comprising:

a computing device executing the home-node email manager program with the first configuration including an enablement of a mobile-node reconfiguration capability that configures the home-node email manager program with the first configuration and a home node security feature identification established for the home-node email manager program;

a receiver that receives a status summary request, which requests a current configuration of the home-node email manager program, and that receives a mobile-node-communicated reconfiguration message, said reconfiguration message including the mobile node security feature identification and instructions to make a reconfiguration change to a home node configuration file for reconfiguring effectuation of disposition of the email messages responsive to the reconfiguration message;

a configuration status summary returner that returns a configuration status summary of the first configuration of the home node email manager to the mobile node;

a security feature identification checker that checks said mobile node security feature identification against said home node security feature identification;

a comparator that compares the instructions to make said reconfiguration change with said first configuration of the home-node email manager program to determine if the reconfiguration message is considered to be proper and logically consistent with the home node email manager program when said mobile node security feature identification and said home node security feature identification match;

a home-node email manager program reconfigurer that reconfigures the home-node email manager program to a second configuration of the home-node email manager program including said reconfiguration change when said reconfiguration change is determined to be proper and logically consistent with said first configuration of said home node email manager program, wherein a first email type message received at the home node is automatically provided a first type of disposition prior to receipt of the reconfiguration message and provided a second type of disposition after receipt of the reconfiguration message, the email being unchanged by dispositions; and a transmitter that transmits a confirmation message to said mobile-node, said confirmation message including a summary of said second configuration of said home-node email manager program.

9. The apparatus of claim 8 further comprising a transmitter that transmits an acknowledgement message to the mobile-node indicating results of said comparison of the included reconfiguration change with said first configuration.

10. The apparatus of claim 9 wherein said acknowledgement message includes a request for mobile-node reconfirmation message when said reconfiguration change is determined to be incompatible with said first configuration.

11. The apparatus of claim 8 wherein said mobile node and home node security feature identification comprises a password.

12. The apparatus of claim 8 wherein said mobile node and home node security feature identification further comprises a specification of only certain mobile-nodes as being authorized to have reconfiguration messages executed by the home-node.

13. Apparatus for a communication network having at least a mobile-node and a home-node, the home-node including a configured email manager program capable of automatically effectuating a plurality of different dispositions for different email messages received at the home-node in accordance with a configuration of the home-node email manager, and the mobile-node comprising a memory device operable to store a mobile-node security feature identification and a current configuration status included in a confirmation message, said apparatus for reconfiguring the home-node email manager from the mobile node, said apparatus comprising:
- a configuration status request message generator selectably coupled to the communication network and configured for selectably generating a status summary request for transmission to the home node in order to determine the current configuration of the email manager;
- a receiver configured to receive a configuration status summary of the current configuration of the email manager;
- a reconfiguration message generator selectably coupled to the communication network for generating a reconfiguration message comprising a mobile-node security feature identification and instructions to make changes to a home-node configuration file for reconfiguring the effectuation of disposition of the email messages responsive to the reconfiguration message; and
- a transmitter configured to transmit the reconfiguration message to the home-node wherein the home-node performs the reconfiguration of the home-node email manager when said mobile-node security feature matches a home-node security feature and when the home-node determines the reconfiguration message is considered to be proper and logically consistent with the home-node desktop email manager;
- whereby a first type email message received at the home-node from the communication network is automatically provided a first type of disposition prior to receipt of the reconfiguration message and provided a second type disposition after receipt of the reconfiguration message, the email messages being unchanged by dispositions.

14. The apparatus of claim 13, said receiver further configured to receive an acknowledgement message from the home-node indicating results of said comparison of the included reconfiguration change with said first configuration.

15. The apparatus of claim 13 wherein said security feature identification comprises a password.

16. The apparatus of claim 13 wherein said security feature identification further comprises a specification of only certain mobile-nodes as authorized to have reconfiguration messages executed by the home-node.

17. A method for reconfiguring a home-node desktop email program from a mobile-node through a communication network, the home-node desktop email manager being capable of automatically effectuating a plurality of different dispositions for different email messages received at the home node, in accordance with a configuration of the home-node email manager and wherein the mobile-node includes a memory device operable to store a mobile-node security feature identification and a current configuration status included in a confirmation message, said method comprising:
- selectably generating a status summary request at a configuration status request message generator selectably coupled from the mobile-node to the communication network for transmission to the home node in order to determine the current configuration of the email manager;
- receiving a configuration status summary of the current configuration of the email manager at the mobile-node;
- generating at the mobile-node a reconfiguration message comprising a mobile-node security feature identification and instructions to make changes to a home-node configuration file for reconfiguring the effectuation of disposition of the email messages responsive to the reconfiguration message; and
- transmitting the reconfiguration message to the home-node wherein the home-node performs the reconfiguration of the home-node email manager when said mobile-node security feature matches a home-node security feature and when the home-node determines the reconfiguration message is considered to be proper and logically consistent with the home-node desktop email manager;
- whereby a first type email message received at the home-node from the communication network is automatically provided a first type of disposition prior to receipt of the reconfiguration message and provided a second type disposition after receipt of the reconfiguration message, the email messages being unchanged by dispositions.

18. The method of claim 17 further comprising receiving an acknowledgement message from the home-node indicating results of said comparison of the included reconfiguration change with said first configuration.

19. The method of claim 18 wherein said security feature identification comprises a password.

20. The method of claim 18 wherein said security feature identification further comprises a specifying of only certain mobile-nodes as authorized to have reconfiguration messages executed by the home-node.

\* \* \* \* \*